United States Patent [19]

Maesato

[11] Patent Number: 5,175,621
[45] Date of Patent: Dec. 29, 1992

[54] GAMMA CORRECTION CIRCUIT AND METHOD THEREOF

[75] Inventor: Shin'ichi Maesato, Tokyo, Japan

[73] Assignee: Ikegami Tsushinki Co., Ltd., Tokyo, Japan

[21] Appl. No.: 564,141

[22] Filed: Aug. 7, 1990

[30] Foreign Application Priority Data

Aug. 10, 1989 [JP] Japan .................................. 1-205747

[51] Int. Cl.⁵ ........................................... H04N 5/202
[52] U.S. Cl. ............................................ 358/164; 358/32
[58] Field of Search .................. 358/164, 32, 162, 160

[56] References Cited

U.S. PATENT DOCUMENTS

| | | | |
|---|---|---|---|
| 3,970,774 | 7/1976 | Bazin et al. | 358/160 |
| 4,038,685 | 7/1977 | Bazin | 358/32 |
| 4,200,888 | 4/1980 | Blom | 358/164 |

FOREIGN PATENT DOCUMENTS

| | | | |
|---|---|---|---|
| 111477 | 6/1984 | Japan | 358/164 |
| 102568 | 5/1988 | Japan . | |

*Primary Examiner*—Tommy P. Chin
*Attorney, Agent, or Firm*—Spencer & Frank

[57] ABSTRACT

Non-linear outputs $x^A$ and $x^B$ for input signals x are calculated by referring to look-up tables, in which pairs of input and output signals with respect to gamma coefficients A and B different from each other are stored. These outputs $x^A$ and $x^B$ are multiplied by coefficients $(1-k)$ and k, respectively, and the products are added to each other. Gamma correction outputs are approximately outputted from the result $x^A \times (1-k) + x^B \times k$. Any desired gamma characteristics can be obtained by varying the value of k in the range of 0 to 1. It is sufficient that the gamma characteristics data stored in the look-up tables (in advance) are only two kinds of data. A variety of gamma characteristics can be provided without increasing the memory capacities of the look-up tables.

4 Claims, 11 Drawing Sheets

| GAMMA | k |
|---|---|
| 0.350 | 1.000 |
| 0.355 | 0.971 |
| 0.360 | 0.943 |
| 0.365 | 0.915 |
| 0.370 | 0.887 |
| 0.375 | 0.859 |
| 0.380 | 0.832 |
| 0.385 | 0.804 |
| 0.390 | 0.777 |
| 0.395 | 0.750 |
| 0.400 | 0.723 |
| 0.405 | 0.697 |
| 0.410 | 0.670 |
| 0.415 | 0.644 |
| 0.420 | 0.618 |
| 0.425 | 0.592 |
| 0.430 | 0.566 |
| 0.435 | 0.541 |
| 0.440 | 0.516 |
| 0.445 | 0.490 |
| 0.450 | 0.466 |
| 0.455 | 0.441 |
| 0.460 | 0.416 |
| 0.465 | 0.392 |
| 0.470 | 0.367 |
| 0.475 | 0.343 |
| 0.480 | 0.319 |
| 0.485 | 0.295 |
| 0.490 | 0.272 |
| 0.495 | 0.248 |
| 0.500 | 0.225 |
| 0.505 | 0.202 |
| 0.510 | 0.179 |
| 0.515 | 0.156 |
| 0.520 | 0.133 |
| 0.525 | 0.111 |
| 0.530 | 0.088 |
| 0.535 | 0.066 |
| 0.540 | 0.044 |
| 0.545 | 0.022 |
| 0.550 | 0.000 |

| x | g(x,0.450) | f(x,0.466) | f(x,0.466)−g(x,0.450) |
|---|---|---|---|
| 0.000 | 0.000 | 0.000 | 0.000 |
| 0.020 | 0.172 | 0.181 | 0.009 |
| 0.040 | 0.235 | 0.242 | 0.007 |
| 0.060 | 0.282 | 0.288 | 0.006 |
| 0.080 | 0.321 | 0.326 | 0.005 |
| 0.100 | 0.355 | 0.359 | 0.004 |
| 0.120 | 0.385 | 0.388 | 0.003 |
| 0.140 | 0.413 | 0.415 | 0.002 |
| 0.160 | 0.438 | 0.440 | 0.002 |
| 0.180 | 0.462 | 0.464 | 0.001 |
| 0.200 | 0.485 | 0.486 | 0.001 |
| 0.220 | 0.506 | 0.507 | 0.001 |
| 0.240 | 0.526 | 0.526 | 0.000 |
| 0.260 | 0.545 | 0.545 | 0.000 |
| 0.280 | 0.564 | 0.564 | 0.000 |
| 0.300 | 0.582 | 0.581 | 0.001 |
| 0.320 | 0.599 | 0.598 | 0.001 |
| 0.340 | 0.615 | 0.614 | 0.001 |
| 0.360 | 0.631 | 0.630 | 0.001 |
| 0.380 | 0.647 | 0.646 | 0.001 |
| 0.400 | 0.662 | 0.661 | 0.001 |
| 0.420 | 0.677 | 0.675 | 0.001 |
| 0.440 | 0.691 | 0.690 | 0.002 |
| 0.460 | 0.705 | 0.703 | 0.002 |
| 0.480 | 0.719 | 0.717 | 0.002 |
| 0.500 | 0.732 | 0.730 | 0.002 |
| 0.520 | 0.745 | 0.743 | 0.002 |
| 0.540 | 0.758 | 0.756 | 0.002 |
| 0.560 | 0.770 | 0.769 | 0.002 |
| 0.580 | 0.783 | 0.781 | 0.002 |
| 0.600 | 0.795 | 0.793 | 0.002 |
| 0.620 | 0.806 | 0.805 | 0.002 |
| 0.640 | 0.818 | 0.816 | 0.002 |
| 0.660 | 0.829 | 0.828 | 0.002 |
| 0.680 | 0.841 | 0.839 | 0.002 |
| 0.700 | 0.852 | 0.850 | 0.002 |
| 0.720 | 0.863 | 0.861 | 0.001 |
| 0.740 | 0.873 | 0.872 | 0.001 |
| 0.760 | 0.884 | 0.883 | 0.001 |
| 0.780 | 0.894 | 0.893 | 0.001 |
| 0.800 | 0.904 | 0.903 | 0.001 |
| 0.820 | 0.915 | 0.914 | 0.001 |
| 0.840 | 0.925 | 0.924 | 0.001 |
| 0.860 | 0.934 | 0.934 | 0.001 |
| 0.880 | 0.944 | 0.943 | 0.001 |
| 0.900 | 0.954 | 0.953 | 0.001 |
| 0.920 | 0.963 | 0.963 | 0.001 |
| 0.940 | 0.973 | 0.972 | 0.000 |
| 0.960 | 0.982 | 0.982 | 0.000 |
| 0.980 | 0.991 | 0.991 | 0.000 |

```
              ADC
    DRS    INPUT              16
     0  →    0    ┌─────────────────┐
                  │        0        │
                  ├─────────────────┤
                  │        ┊        │
     1  →   16    │       16        │
                  ├─────────────────┤
                  │        ┊        │
     2  →   23    │       23        │
                  ├─────────────────┤
                  │        ┊        │
     3  →   28    │       28        │
                  ├─────────────────┤
                  │                 │
     4  →   32    │       32        │
                  ├─────────────────┤
                  │                 │
     5  →   36    │       36        │
                  ├─────────────────┤
                  │        ┊        │
                  │                 │
                  │        ┊        │
                  │                 │
                  ├─────────────────┤
    254 →  254    │      254        │
                  ├─────────────────┤
    255 →  255    │      255        │
                  └─────────────────┘
            ERROR  CORRECTION  TABLE
                     ( INITIAL )

FIG. 7A
```

```
         ADC
   DRS  OUTPUT      16
    0 ──→ 0    |  0    |
                |  ┆    |
    1 ──→ 13   | 16    |
                |  ┆    |
    2 ──→ 19   | 23    |
                |  ┆    |
    3 ──→ 24   | 28    |
    4 ──→ 27   | 32    |
    5 ──→ 31   | 36    |
                |  ┆    |
                |  ┆    |
                |  ┆    |
                |  ┆    |
  254 ──→ 254  | 254   |
  255 ──→ 255  | 255   |
```

ERROR CORRECTION TABLE
(UPDATED)

FIG. 7B

ADC
DRS OUTPUT 16

| DRS | ADC OUTPUT |
|---|---|
| 0 → 0 | 0 |
| | ⋮ |
| 1 → 15 | 16 |
| | ⋮ |
| 2 → 18 | 23 |
| | ⋮ |
| 3 → 23 | 28 |
| | ⋮ |
| 4 → 26 | 32 |
| | ⋮ |
| 5 → 30 | 36 |
| | ⋮ |
| 254 → 254 | 254 |
| 255 → 255 | 255 |

ERROR CORRECTION TABLE
(FURTHER UPDATED)

FIG. 7C

GAMMA CORRECTION CIRCUIT AND METHOD THEREOF

BACKGROUND OF THE INVENTION

1. Field of the Invention

The present invention relates to a non-linearly approximation circuit and a method thereof for video signals with a look-up table, in particular to a gamma correction circuit and a method thereof being applicable to video signal processing apparatus of a television (TV), a TV camera and so on.

2. Description of the Prior Art

Generally, a gamma correction circuit of an analogue type is described in, for example, U.S. Pat. No. 3,970,774, entitled "Electronic Signal Mixer" and U.S. Pat. No. 4,038,685, entitled "Apparatus for Automatic Gamma Control of Television Color Signals". In U.S. Pat. No. 3,970,774, a first output obtained by additively or differentially combining first and second signals, is combined with a product output which is also obtained by additively or differentially combining the first and second signals and further multiplying the combined signal by a coefficient, so as to provide an output signal having a desired ratio of the first and second signals in accordance with the coefficient. In U.S. Pat. No. 4,038,685, a gamma correction circuit is controlled in accordance with the comparison results obtained by comparing R, G and B color television signals with first and second levels, thereby automatically and continuously correcting the gamma characteristics.

In order to deal with the latest digital processing of a video signal, another method of gamma correction is known wherein the values of output signals, $g(x, \gamma) = x\gamma$ in which a gamma correction with a gamma correction coefficient $\gamma$ is made, are calculated in advance and stored in a so-called look-up table in the form of a pair of the input signal x and the output signal $x\gamma$. The present invention relates to a gamma correction circuit having such a look-up table.

In general, it is preferable that the gamma correction coefficient $\gamma$ is variable and finely adjustable over the range from 0.35 to 0.55, but in accordance with the above-mentioned look-up table method, an amount of the data for the variable coefficients greatly increases. For example, when the number of quantized bits is eight bits, 256 bytes are necessary for a certain kind of the gamma coefficient. When it is required to vary the gamma coefficient with ten levels, the data becomes 2560 bytes.

Namely, in order to perform the gamma correction finely, the necessary memory capacity of the look-up table is increased.

SUMMARY OF THE INVENTION

In view of the above, an object of the present invention is to provide a gamma correction circuit and a method thereof, in which a look-up table is provided and a variety of gamma correction characteristics can be accomplished without substantially increasing the memory capacity.

In the first aspect of the present invention, a gamma correction circuit comprises:

a first non-linear circuit having first gamma characteristics and receiving an input signal;

a second non-linear circuit having second gamma characteristics which are different from the first gamma characteristics, and receiving the input signal;

a first coefficient circuit for generating a first coefficient which is variable;

a second coefficient circuit for generating a second coefficient related to the first coefficient;

a first multiplier for multiplying an output from the first non-linear circuit by the second coefficient derived from the second coefficient circuit;

a second multiplier for multiplying an output from the second non-linear circuit by the first coefficient derived from the first coefficient circuit; and an adder for adding the outputs from the first multiplier and the second multiplier to obtain a gamma correction output.

Here, the first and second non-linear circuits, respectively, may have first and second look-up tables which store pairs of inputs x and outputs $x^A$ and pairs of inputs x and outputs $x^B$ with respect to gamma coefficients A and B ($1 \geq A < 0.45 < B \geq 0$) of the first and second gamma characteristics, respectively.

The first coefficient may be equal to k, and the second coefficient is equal to (1−k).

The gamma coefficients A and B may be substantially equal to 0.55 and 0.35, respectively.

In the second aspect of the present invention, a method of making a gamma correction, comprises the steps of:

providing first and second look-up tables, in which gamma correction outputs $x^A$ and $x^B$ having first and second gamma coefficients A and B ($1 \geq A > 0.45 > B \geq 0$) with respect to an input signal x are stored, respectively;

setting a coefficient k corresponding to desired gamma correction characteristics;

calculating first and second gamma correction outputs $x^A$ and $x^B$ by referring to the first and second look-up tables with respect to the input signal;

multiplying the first and second gamma correction outputs $x^A$ and $x^B$ by coefficients (1−k) and k, respectively; and adding the products $x^A \times (1-k)$ and $x^B \times k$ to each other to obtain the gamma correction outputs.

Here, the gamma coefficients A and B may be substantially equal to 0.55 and 0.35, respectively.

The differences between the present invention and the two U.S. Patents mentioned above will be given. In U.S. Pat. No. 3,970,774, an analog circuit is disclosed and no look-up table is provided therein. Namely, the gamma correction circuit (shown in FIG. 2) includes the linear unity gain amplifier 100 and the non-linear amplifier 200, and the number of non-linear circuits is one. Therefore, the algorithm of the gamma correction used in the above patent differs from that of the present invention. The present invention discloses a circuit arrangement for saving the memory capacity of the look-up table when a variety of the gamma characteristics are realized in the gamma correction circuit having the look-up table. In U.S. Pat. No. 4,038,685, the gamma correction output is fed-back to the gamma corrector, but no such feed-back control is provided in the present invention.

The above and other objects, effects, features and advantages of the present invention will become more apparent from the following description of embodiments thereof taken in conjunction with the accompanying drawings.

BRIEF DESCRIPTION OF THE DRAWINGS

FIGS. 7A, 7B and 7C are schematic diagrams showing the arrangement of an error correction table. FIG. 7A showing the initialized state, and FIGS. 7B and 7C showing the updated state;

DETAILED DESCRIPTION OF PREFERRED EMBODIMENTS

Figure 1:
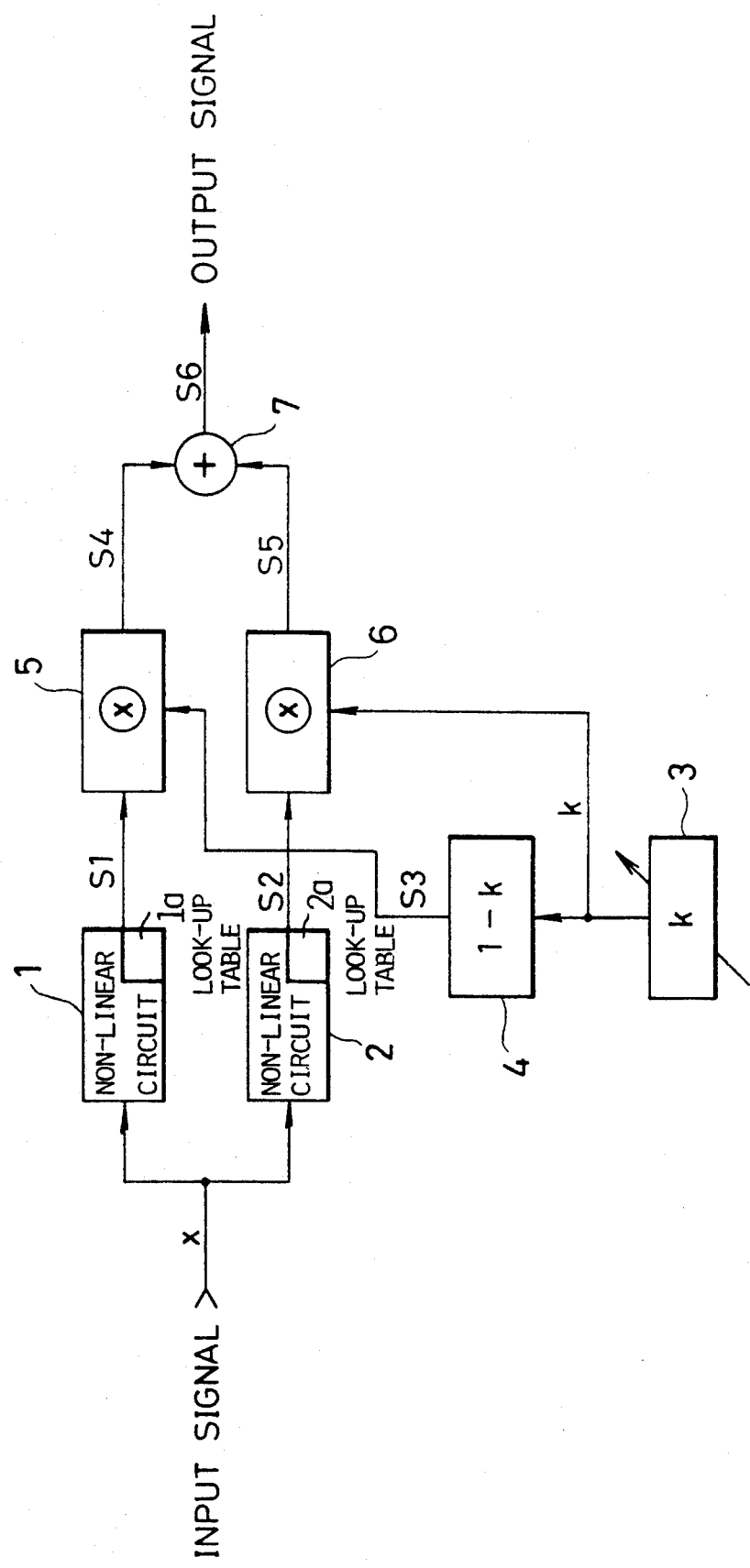
FIG. 1 is a block diagram showing an embodiment of a gamma correction circuit according to the present invention.

FIG. 1 shows an embodiment of the present invention. In FIG. 1, x denotes an input signal, wherein the input signal is deemed to be 100% when x=1. Reference numeral 1 denotes a first non-linear circuit having a look-up Table 1a from which a gamma coefficient can be selected, such as γ=0.55. The non-linear circuit 1 produces the following output S1:

$$S1 = x^{0.55}.$$

Reference numeral 2 denotes a second non-linear circuit having a look-up Table 2a from which a gamma coefficient can be selected, such as γ=0.35. The second non-linear circuit 2 produces the following output S2:

$$S2 = x^{0.35}.$$

As these two non-linear circuits 1 and 2, a non-linear quantizing circuit having a look-up table in the form of a memory device such as an ROM (Read Only Memory) [for example, a circuit disclosed in Japanese Patent Application No. 240,533/1989 (filed Sep. 19, 1989) by the same assignee of the present application; corresponding U.S. Patent Application Ser. No. 07/579,603] filed Sep. 7, 1990 is applicable.

Figure 4:
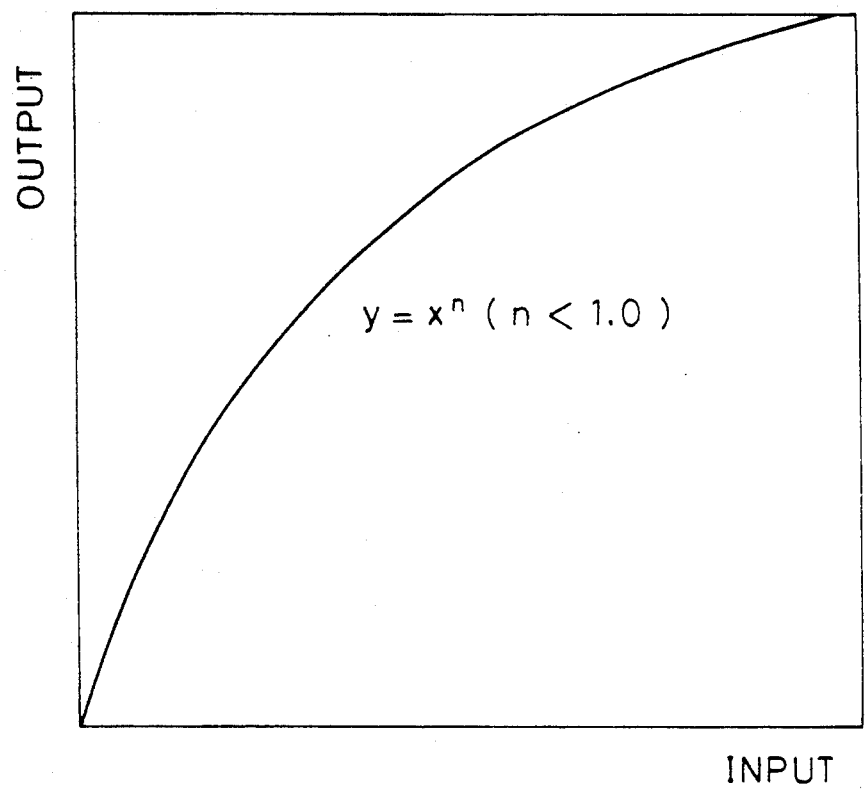
FIG. 4 is a graph illustrating an example of a nonlinear curve.
Figure 5:
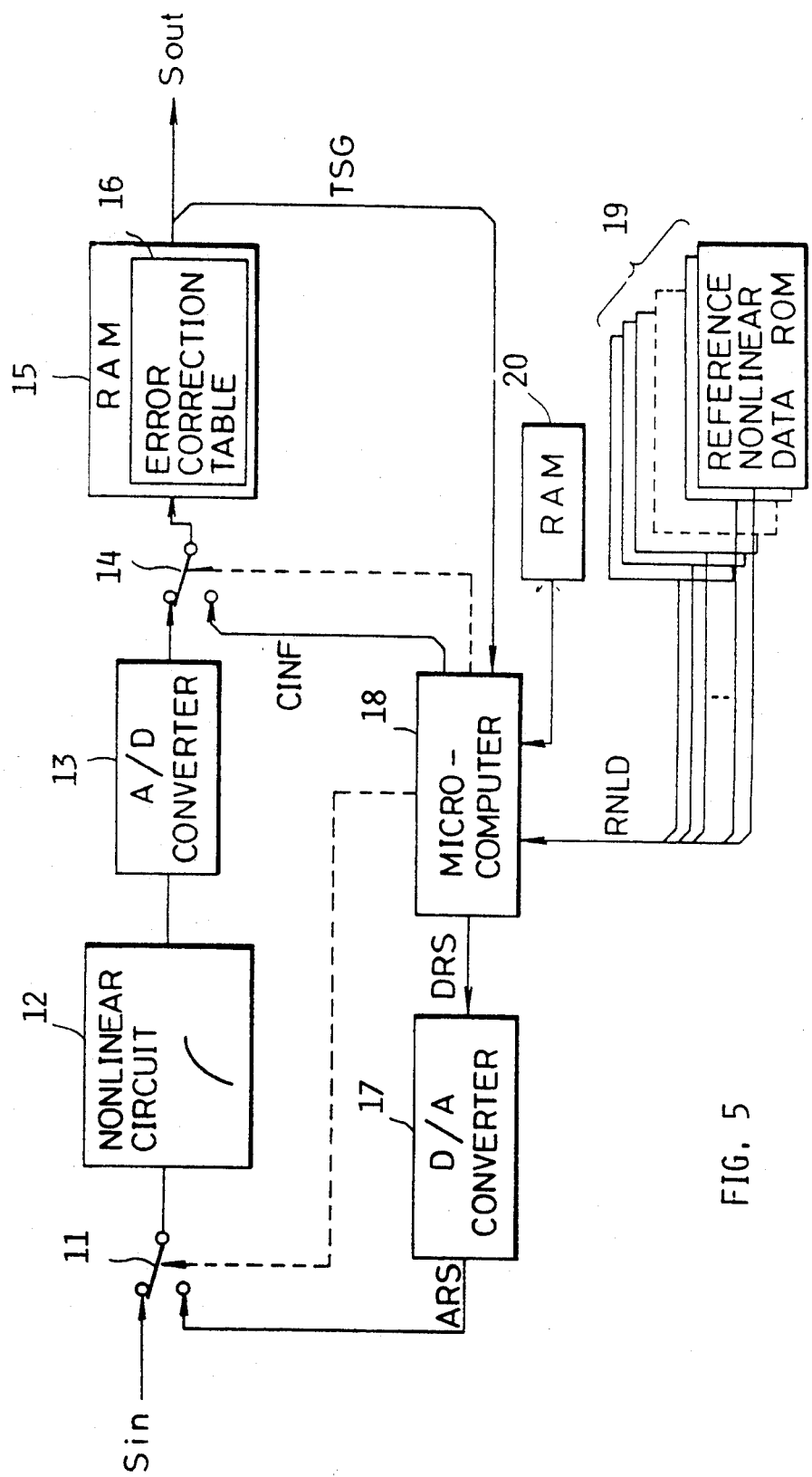
FIG. 5 is a block diagram showing a nonlinear quantization circuit.

FIG. 5 is a block diagram showing the non-linear quantization circuit disclosed in U.S. patent application Ser. No. 07/579,603. In FIG. 5, input signal Sin is fed to a nonlinear circuit 12 through a transfer switch 11. The nonlinear circuit 12 exhibits the characteristics illustrated in FIG. 4. An analog nonlinear signal produced from the nonlinear circuit 12 is converted into a digital signal by an A/D converter 13, thus being quantized. The digital signal is fed to a RAM 15 through a transfer switch 14.

The RAM 15 includes an error correction table 16 for recording error correction information for correcting errors of the nonlinear circuit 12. The error correction information will be described later. The output of the error correction table 16 is supplied to the outside as an output signal Sout, or is fed to a microcomputer 18 as a test signal TSG.

The microcomputer 18 supplies a D/A converter 17 with a digital reference signal DRS. In addition, the microcomputer 18 writes the test signal TSG into a RAM 20, and compares it with reference nonlinear data RNLD read out of a ROM 19, thus producing error correction information CINF. The error correction information CINF is written to the error correction table 16 through the switch 14.

The digital reference signal DRS, the test signal TSG, the reference nonlinear data RNLD, and the error correction information CINF will now be described.

Figure 6:
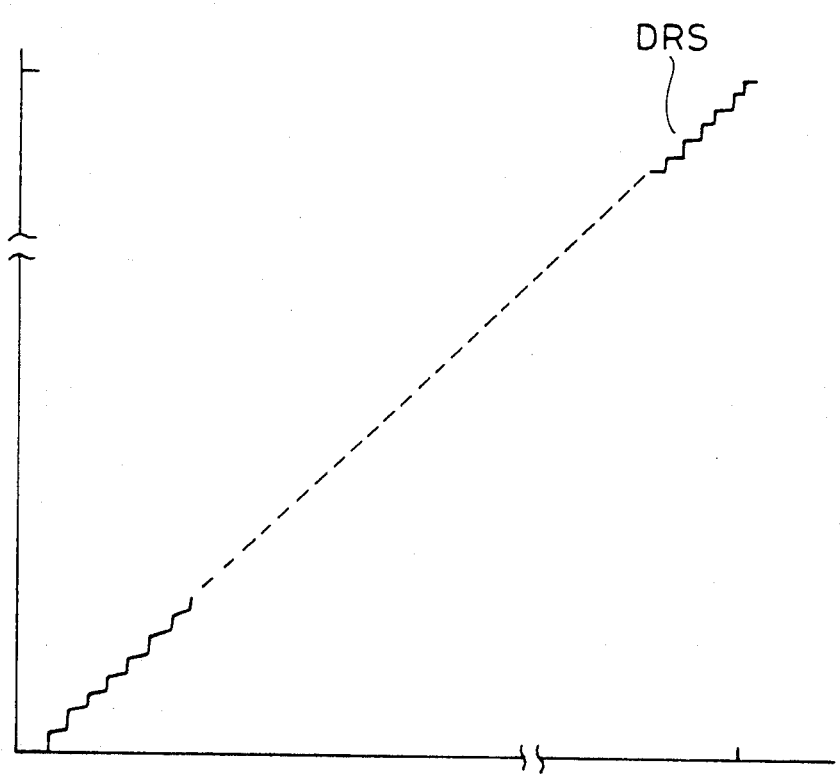
FIG. 6 is a graph illustrating an example of a digital reference signal DRS applied to a D/A converter.

(1) DIGITAL REFERENCE SIGNAL DRS (see FIG. 6)

The microcomputer 18 generates a digital reference signal of a staircase waveform increasing linearly as shown in FIG. 6, and supplies it to the D/A converter 17. The digital reference signal DRS is formed by signal pulses which increase by a fixed step, thus increasing linearly with time. The digital reference signal DRS is converted into an analog reference signal ARS by the D/A converter 17, and is applied to the nonlinear circuit 12 to test its nonlinearity. A staircase waveform decreasing linearly with regard to time can also be used as a digital reference signal.

(2) TEST SIGNAL TSG

The digital reference signal DRS is D/A converted to the analog reference signal ARS, and the signal ARS undergoes the nonlinear conversion of the nonlinear circuit 12. Then, the output of the nonlinear circuit 12 is supplied to the error correction table 16 in the RAM 15. The output of the error correction table 16 in this case is called a test signal TSG, which reflects the nonlinearity of the nonlinear circuit 12.

(3) REFERENCE NONLINEAR DATA RNLD

When the nonlinearity of the nonlinear circuit 12 is ideal and includes no error, the test signal TSG produced from the error correction table 16 corresponds to the perfectly correct waveform. The digital data corresponding to this test signal is stored in the ROM 19 as the reference nonlinear data RNLD.

(4) ERROR CORRECTION INFORMATION CINF

The error correction information CINF is obtained by comparing the test signal TSG and the reference nonlinear data RNLD, and indicates the error of the nonlinear circuit 12.

Generally, the test signal TSG takes discrete values. This is because the nonlinear circuit 12 has a nonlinearity given by the equation $y=x^n$ (n<1.0). Thus, the output of the A/D converter 13 assumes distinctly separated discrete values when the analog reference signal ARS is at a low level.

For example, suppose that the values 0–255 are to be nonlinearly converted according to the curve $y=x^{0.5}$, and then quantized into an 8-bit notation. In this case, the maximum value of the input signal x corresponds to 255 and the minimum value thereof corresponds to 0. When x varies from 0 to 255, the output signal y is expressed by the equation $y=(x/255)^{0.5}\times 255$. According to this equation, the following TABLE 1 is obtained.

TABLE 1

| x | y |
|---|---|
| 0 | 0 |
| 1 | 16 |
| 2 | 23 |
| 3 | 28 |
| 4 | 32 |
| 5 | 36 |
| . | . |
| . | . |
| 254 | 254 |
| 255 | 255 |

As seen from TABLE 1, the smaller the values of x, the greater the separation of the values of y: for example, the values of y between 0 and 16, i.e., 2, 3, 4, ... 15, do not appear in the test signal TSG.

FIGS. 7A and 7B show arrangements of the error correction table 16 in such a case. When the nonlinear circuit 12 has no error, the output of the A/D converter 13 alters its value as 0, 16, 23, 28, 32, 36, ... as the digital reference signal DRS changes it value as 0, 2, 3, 3, 4, 5, ..., respectively. The discrete values produced from the A/D converter 13 are supplied to the address terminal of the error correction table 16. Each address of the error correction table 16 includes error correction information, which can be read out as the output data by designating the address. For example, in FIG. 7A, each address of the error correction table 16 includes the same value as that of the address, which is set at the initial setting.

On the other hand, FIG. 7B is an example of the error correction table 16 when the nonlinear circuit 12 has errors. In this case, the output of the A/D converter 13 alters its values as 0, 13, 19, 24, 27, 31, ... as the digital reference signal changes its values as 0, 1, 2, 3, 4, 5, .... In other words, the errors of the nonlinear circuit 12 result in smaller values than the normal values shown in FIG. 7A. As a result, the error correction table 16 having the same content as that of FIG. 7A will produce the test signal TSG the values of which varies as 0, 13, 19, 24, 27, 31, .... The content of the error correction table 16 is called the error correction information.

The operation of the circuit shown in FIG. 5 can be classified into two groups: (1) the error correction mode; and (2) the common mode. These will be described below.

1. ERROR CORRECTION MODE

In the error correction mode, nonlinearity of the nonlinear circuit 12 is detected, and the error correction information of the error correction table 16 in the RAM 15 is updated according to the test signal TSG. Before entering the error correction mode, the microcomputer 18 changes the switch 11 to the position opposite that shown in FIG. 5 (i.e., the switch 11 is connected to the D/A converter 17) while maintaining the position of the switch 14 at that shown in FIG. 5 (i.e., the switch 14 is connected to the A/D converter 13). Further, the microcomputer 18 initializes the error correction table 16 as shown in FIG. 7A.

The operation of the error correction mode will now be described with reference to the flowchart of FIG. 8.

First, at step S1, the microcomputer 18 generates a pulse that increases by a fixed step at a fixed interval. It is a digital reference signal DRS of the staircase waveform shown in FIG. 6. The digital reference signal DRS is converted into a linear analog reference signal ARS by the D/A converter 17 (step S2), which applies the signal ARS to the nonlinear circuit 12 via the switch 11. The nonlinear circuit 12 nonlinearly converts the analog reference signal ARS (step S3), and supplies the output thereof to the A/D converter 13.

The output of the A/D converter 13 is supplied to the error correction table 16 in the RAM 15 through switch 14 so as to undergo a correction of the error correction table 16 (step S5). In this case, however, the input to and the output from the error correction table 16 are the same because the error correction table 16 is initialized in advance as shown in FIG. 7A. The output of the error correction table 16 is fed back to the microcomputer 18 as the test signal TSG. The test signal TSG is a signal that reflects the preciseness of the nonlinearity of the nonlinear circuit 12.

The microcomputer 18 compares the test signal TSG with the reference nonlinear data RNLD read out from the ROM 19 (step S6). When the microcomputer 18 finds an error (i.e., difference between the two), it proceeds from step S7 to step S8, and sets an error flag to "1". When setting of the error flag is completed or the error is not found at step S7, the microcomputer 18 proceeds to step S9, and writes the test signal TSG into RAM 20.

The above steps S1-S9 are continued until the reference digital signal DRS shown in FIG. 6 reaches the uppermost step and so the pulse thereof is no longer generated. Next, when the error flag is "1", that is, when at least one error is found in the loop of steps S1-S10, the microcomputer proceeds from step S11 to S12, and updates the error correction table 16.

To update the error correction table, the microcomputer 18 first changes the switch 14 to the position opposite that shown in FIG. 5 (i.e., the switch 14 is connected to the microcomputer 18). Namely, both the switches 11 and 14 are transferred to positions opposite those shown in FIG. 5. Thus, the microcompurter 18 enters into the error correction information updating mode, and updates the error correction information CINF of the error correction table 16.

The update is performed as shown in FIG. 7B. For example, let us assume that the test signal TSG alters its values as 0, 13, 19, 24, 27, 31, ..., as the digital reference signal DRS changes its values as 0, 1, 2, 3, 4, 5, .... The reference nonlinear data corresponding to these values of the test signal TSG are 0, 16, 23, 28, 32, 36, ... respectively, as shown in Table 1. Therefore, in the address designated by each value of the test signal TSG, the corresponding value of the reference nonlinear data is stored as shown in FIG. 7B. Thus, the error correction table 16 is updated by using the test data TSG and the reference non-linear data that indicates the correct values of the test signal TSG.

In the process of updating, the following techniques are taken to improve the precision of the error correction table 16.

(1) The acquisition of the test signals TSG is repeated several times by generating the digital reference signal DRS several times. The error correction information is made by averaging several test signals thus obtained.

(2) The data in the error correction table 16 takes such discrete values as 0, 16, 23, 28, 32, ... as shown in FIG. 7A. Therefore, it is necessary to interpolate these discrete values when the error correction table 16 is corrected as shown in FIG. 7B. The simplest interpolation is a linear interpolation. Another interpolation commonly used is a least squares method, which gives a smooth second order interpolation curve.

(3) The bit number of data of the error correction table 16 is set greater than that of the address by m bits, thus improving the arithmetic accuracy of the error correction by a factor of $2^m$. For example, the bit number of the data is set at 12 bits, whereas that of the address is set at 10 bits. This makes it possible to improve the accuracy of the error correction information obtained by the interpolation.

Figure 8:
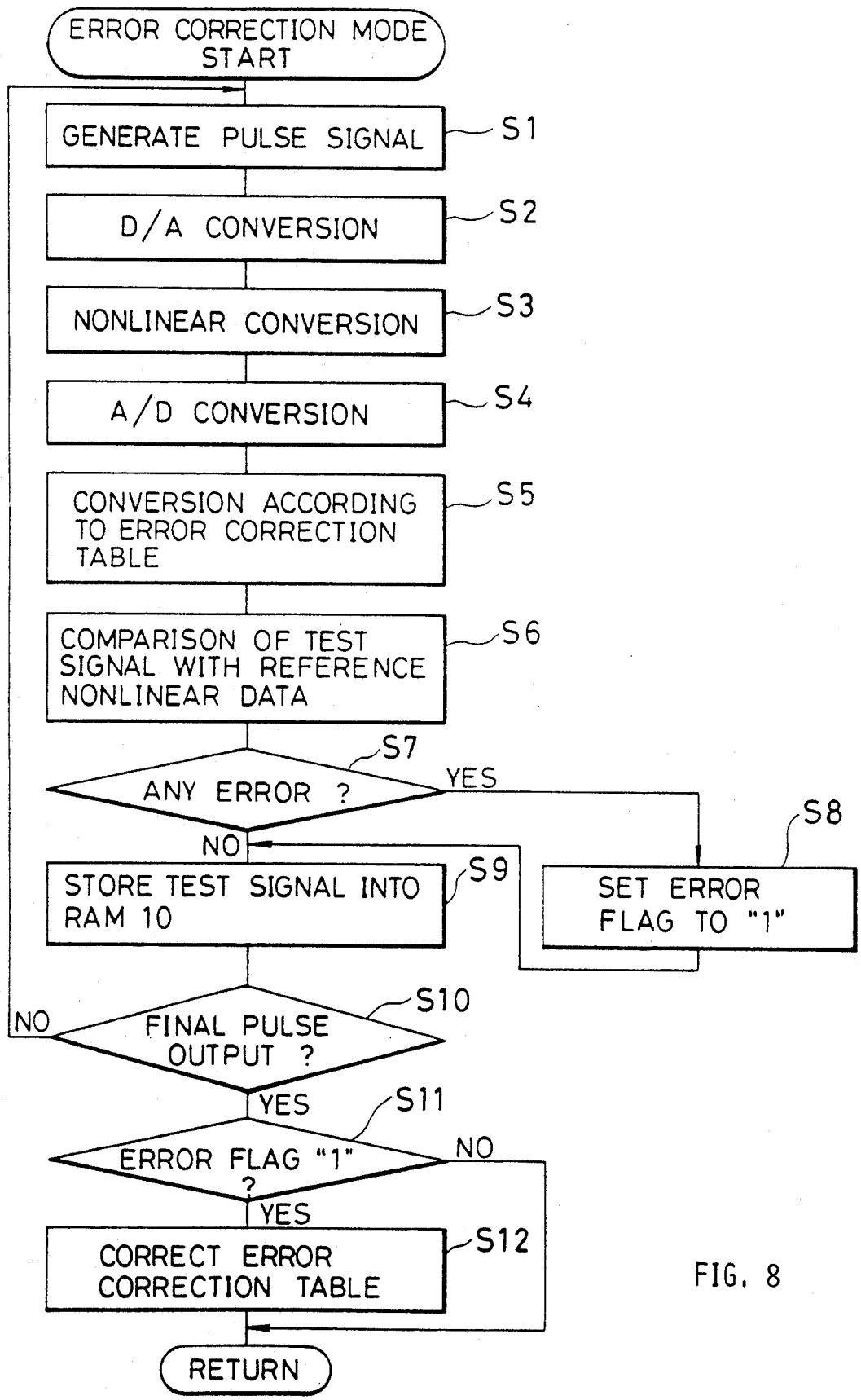
FIG. 8 is a flowchart showing the operation of the quantization circuit.

Incidentally, the error correction table 16 need not be initialized when step S5 in FIG. 8 is performed in the error correction mode. For example, let us assume that the error correction table 16 has been updated as shown in FIG. 7B by the first error correction processing, that the characteristics of the nonlinear circuit 12 change by deterioration with age and the like, and that the test signal TSG changes as 0, 15, 18, 22, 26, 30, ... when the input signal to the nonlinear circuit 2 changes as 0, 1, 2, 3, 4, 5, ... at the second error correction processing. In this case, the error correction table 16 is updated as shown in FIG. 7C. Accordingly, although the error correction table 16 must be initialized when the circuit or method is used for the first time, it need not be initialized thereafter.

2. COMMON MODE

When the switches 11 and 14 are transferred at the positions shown in FIG. 5 (i.e., the switch 11 is connected to the input signal Sin and the switch 14 is connected to the A/D converter 13), the nonlinear quantization circuit enters into the common mode. In the common mode, the input signal Sin converted by the nonlinear circuit 12 is further converted into a digital signal by the A/D converter 13. The digital signal is applied to the address terminal of the RAM 15 to designate the error correction information stored in the error correction table 16 in the RAM 15. In this case, the error correction table 16 has been updated as shown in FIG. 7B. As a result, the output signal Sout from the error correction table 16 is produced in the correct form after undergoing the correction included in the nonlinear circuit 12.

Figure 9:
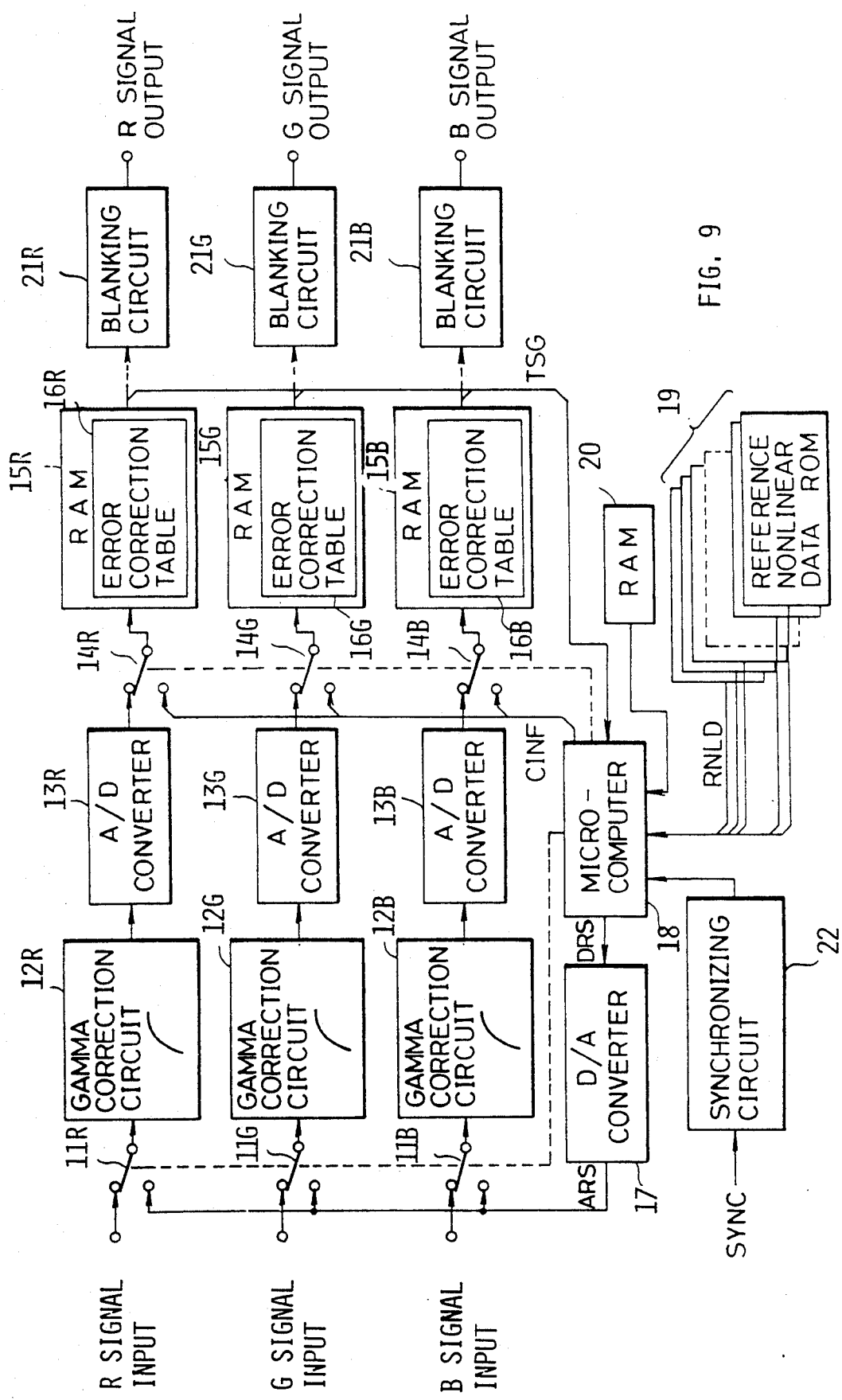
FIG. 9 is a block diagram showing a nonlinear quantization circuit applied to a color television camera.

FIG. 9 is a block diagram showing the quantization circuit applied to a color television camera. There are three quantization circuits corresponding to R, G and B input signals, respectively. More specifically, there are provided three circuits each having a transfer switch 11 (11R, 11G, 11B), a gamma correction circuit 12 (12R, 12G, 12B) corresponding to the nonlinear circuit 12 of FIG. 5, an A/D converter 13 (13R, 13G, 13B), a transfer switch 14 (14R, 14G, 14B), and a RAM 15 (15R, 15G, 15B) including an error correction table 16 (16R, 16G, 16B). In addition, three blanking circuits 21 (21R, 21G, 21B) are provided for receiving the output signals from the error correction tables 16. Moreover, a synchronizing circuit 22 is connected to the microcomputer 18. The synchronizing circuit 22 sends an interrupt to the microcomputer 18 at the starting points of each horizontal blanking interval and vertical blanking interval.

The error correction mode and the common mode are alternately performed on a time sharing basis by transferring the switches 11 and 14 by means of the microcomputer 18.

(1) ERROR CORRECTION MODE

The microcomputer 18 enters into the error correction mode by changing the switches 11 to the positions opposite those shown in FIG. 9 (i.e., the switches 11 are connected to the D/A converter 17). On receiving an interrupt caused by the horizontal blanking interval from synchronizing circuit 22, the microcomputer 18 generates a single pulse increasing by one step each time the horizontal blanking interval occurs. The single pulses constitute the reference digital signal DRS. After that, update of the error correction table 16 is independently performed for each of the R, G and B channels.

More specifically, each time the reference digital signal DRS is generated, the test signal TSG is written into the RAM 20, and is compared with the reference nonlinear data RNLD. When the signal TSG and the data RNLD disagree, that is, when any one of the gamma correction circuits 12 includes a deviation from the predetermined nonlinearity, the error correction table 16 is updated by using the test signal TSG and the reference nonlinear data RNLD. The microcomputer 18 updates the error correction table 16 during the vertical blanking intervals by changing the switches 14 to the positions opposite to those shown in FIG. 9. The single pulses superimposed on the horizontal blanking intervals are suppressed in the blanking circuit 21.

It is clear that the single pulses can be replaced by a plurality of pulses each of which sequentially increase by a fixed step.

(2) COMMON MODE

Microcomputer 18 enters into the common mode when the switches 11 and 14 are placed at the positions shown in FIG. 9. In the common mode, each video signal R, G, B independently undergoes gamma correction, and is quantized by the A/D converter 13. Each quantized signal further undergoes error correction by the error correction table 16, has blanking signals added in the blanking circuit 21, and is produced as an output video signal. Thus, the errors included in the gamma correction circuits 12 are independently corrected for respective video signals R, G and B. This prevents color tone changes resulting from errors in the nonlinear curves of the R, G and B channels, thus improving the quality of the video signal.

In the embodiment shown in FIG. 9, the error correction mode is carried out during the horizontal and vertical blanking intervals. Consequently, the error correction mode can be performed in parallel with the operation of the color televison camera on a time sharing basis. When the error correction table 16 is initialized during operation of the circuit of FIG. 9, the data of the error correction table 16 may sharply change after the initialization. This change of the data by the initialization will suddenly change the gamma characteristics of the gamma correction circuit 12, resulting in a sudden change of the output of the gamma correction circuit 12. Thus, the output image of the television camera will greatly differ before and after the initialization. In contrast with this, when the error correction table 16 is updated from the state before the initialization (for example, from the state shown in FIG. 7B) to the state shown in FIG. 7C, the amount of correction is assumed to be smaller. Thus the change of the output of the gamma correction circuit 12 will be small, preventing a sudden change in the output image of the television camera.

In addition to the embodiments described above, the following modifications can be made:

(1) Any nonlinear quantization can be achieved by prestoring any predetermined nonlinear curve in advance as reference nonlinear data. Furthermore, the quantization circuit can be used for linear as well as nonlinear corrections.

(2) Although in the quantization circuit applied to a color television camera the error correction is performed during the horizontal and vertical blanking intervals so that the error correction does not interfere with the video signals, the error correction can be performed during the video intervals. This will greatly shorten the processing time.

(3) Although the test signals are acquired by transferring the switches 11 during the horizontal blanking intervals in the quantization circuit applied to a color television camera, the switches 11 are unnecessary. This is because the reference digital signal DRS is superimposed on the horizontal blanking intervals on a time sharing basis.

(4) The update and interpolation of the error correction table 16 is carried out after completing the acquisition of all the test signals TSG. The timing of the update and interpolation is not so restricted. For example, the interpolation and the update can be sequentially performed at the time the test signals required for interpolation have been acquired (the number of signals required is two for linear interpolation, and three for two dimensional interpolation).

Returning to FIG. 1, reference numeral 3 denotes a coefficient generating circuit which produces a desired approximation coefficient k. This circuit is constructed by, for example, a conventional rotary encoder, in which the value k indicating desired gamma characteristics can be preset by the rotary encoder.

Reference numeral 4 denotes a substractor circuit which receives the output k from the circuit 3 and provides the following output S3:

$$S3 = 1 - k.$$

Reference numeral 5 denotes a first multiplier circuit which provides an output $S4=(S1)\times(S3)$ by multiplying the output S1 from the non-linear circuit 1 and the output S3 from the subtractor circuit 4. Reference numeral 6 denotes a second multiplier circuit which provides an output $S5=(S2)\times(k)$ by multiplying the output S2 from the non-linear circuit 2 and the output k from the coefficient circuit 3.

Reference numeral 7 denotes an adder circuit which provides the following output S6 by adding the outputs S4 and S5 from the multiplier circuits 5 and 6:

$$\begin{aligned} S6 &= (S4) + (S5) \\ &= (S1) \times (S3) + (S2) \times (k) \\ &= x^{0.55} \times (1 - k) + x^{0.35} \times k. \end{aligned}$$

According to the present invention, the gamma correction circuit having any desired gamma characteristics is obtained by adding the output signals S1 and S2 from the two non-linear circuits 1 and 2, which receive the same input signal x, with weightings $(1-k)$ and k, respectively. Herein, an approximate equation of the gamma correction characteristics can be derived as follows:

$$f(x, k) = x^A \times (1-k) + x^B \times k$$

wherein k is an approximation coefficient for indicating a desired gamma value.

Herein, A is a coefficient of the first gamma characteristics, and B a coefficient of the second gamma characteristics. If a desired gamma characteristic has a gamma coefficient G, it is sufficient that the value of G to be approximated by the above equation has the following relationship:

$$A > G > B.$$

For example, G=0.45 is the reference value of the gamma characteristics particularly used in a TV camera.

In order to more precisely approximate the gamma characteristics, a desired range of G is defined by A and B and the values A and B are made closer to each other. From a practical point of view, the values A and B should be determined by considering an error of the approximation value and the range available for G.

For instance, when making the gamma coefficient $\gamma$ variable from 0.35 to 0.55 on both sides of the reference value 0.45, it is sufficient to set A and B follows:

$$A = 0.55$$

$$B = 0.35.$$

In order to determine the coefficient k which minimizes the error between f(x, k) and g(x, $\gamma$), there are various ways. As one example, explanation will be made of a method in which the coefficient k is obtained by minimizing the difference between an area surrounded by the x-axis and f(x, k) in the range of $1 \geq x \geq 0$ and an area surrounded by the x-axis and g(x, $\gamma$) in the range of $1 \geq x \geq 0$.

It is assumed that an area of f(x, k) in a range of $1 \geq x \geq 0$ is A1, and that an area of g(x, $\gamma$) in a range of $1 \geq x \geq 0$ is A2. Then, the following equations are derived.

$$\int_0^1 f(x, k)dx = A1$$

$$\int_0^1 g(x, \gamma)dx = A2.$$

When A1=A2, the difference in area is at a minimum and accordingly it is considered that the error between f(x, k) and g(x, $\gamma$) is minimized. Under the assumption, the relationship among k, $\gamma$, A and B is obtained as follows:

$$\int_0^1 f(x, k)dx = \int_0^1 g(x, \gamma)dx.$$

Here, $1 \geq A > \gamma > B \geq 0$ $1 \geq k \geq 0$ $$\therefore \int_0^1 \{(1-k)x^A + kx^B\}dx = \int_0^1 x^\gamma dx$$

This equation is developed as follows.

$$\left[ (1-k) \cdot \frac{1}{A+1} x^{A+1} + k \cdot \frac{1}{B+1} x^{B+1} \right]_0^1 =$$

-continued $$\left[\frac{1}{\gamma-1}x^{\gamma-1}\right]_0^1$$

$$\frac{1-k}{A-1}+\frac{k}{B-1}=\frac{1}{\gamma-1}$$

This relation is modified as follows.

$(1-k)(B-1)(\gamma-1)+k\cdot(A-1)(\gamma-1)=(A-1)(B-1)$ $(1-k)(B\gamma-B-\gamma-1)+k(A\gamma-A-\gamma-1)=$ $$AB-A-B+1$$

$B\gamma-B-\gamma+1-Bk\gamma-Bk-\gamma k-k-Ak\gamma-Ak+$ $$k\gamma+k=AB-A-B+1$$

$\therefore k(A\gamma-A+\gamma-1-B\gamma-B-\gamma-1)=AB-A+B+$ $$1-B\gamma-B-\gamma-1$$

$$k=\frac{AB-A-B-1-B\gamma-B-\gamma-1}{(\gamma-1)(A-B)}$$

$$\therefore k=\frac{AB-A-\gamma(B-1)}{(\gamma-1)(A-B)}=\frac{(B-1)(A-\gamma)}{(\gamma-1)(A-B)}$$

If $\gamma=0.45$, $A=0.55$ and $B=0.35$, a k value of 0.4655172 is obtained.

Figures 2A, 2B:
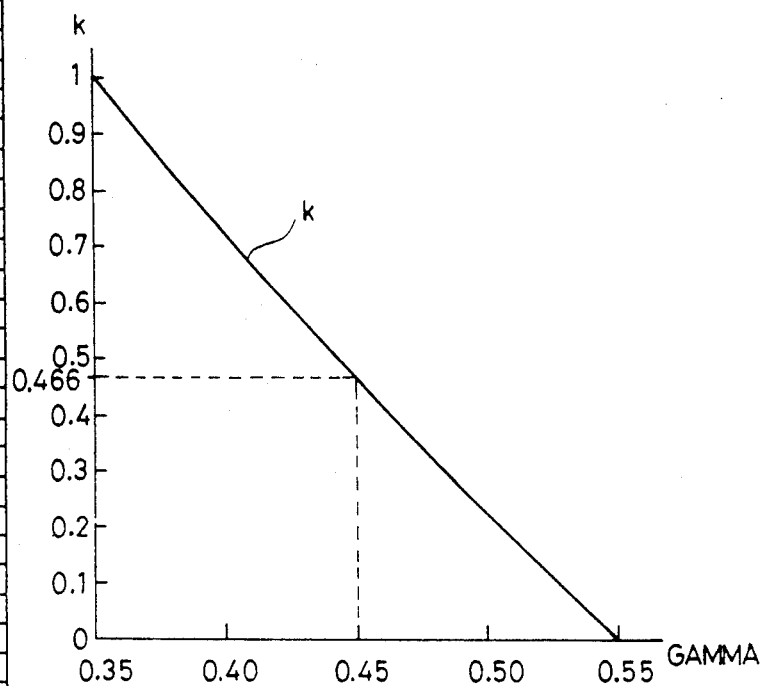
FIG. 2A is a table showing the values of an approximation coefficient k corresponding to gamma γ coefficients in the embodiment.
FIG. 2B is a graph showing the relationship between the gamma coefficient γ and the approximation coefficient k.

FIG. 2A is a table showing the values of k, with which the following equation is established when the gamma $\gamma$ varies from 0.35 to 0.55:

$$f(x,k)\approx g(x,\gamma).$$

FIG. 2B is a graph showing the above table in the form of a graph. FIGS. 2A and 2B indicate the values k, with which the difference between the equations f(x, k) and g(x, $\gamma$) becomes small when the gamma $\gamma$ varies from 0.35 to 0.55. For instance, if k=0.466 when $\gamma=0.45$, it is indicated that the equation f(x, k) is substantially equal to the equation g(x, $\gamma$).

Figures 3A, 3B:
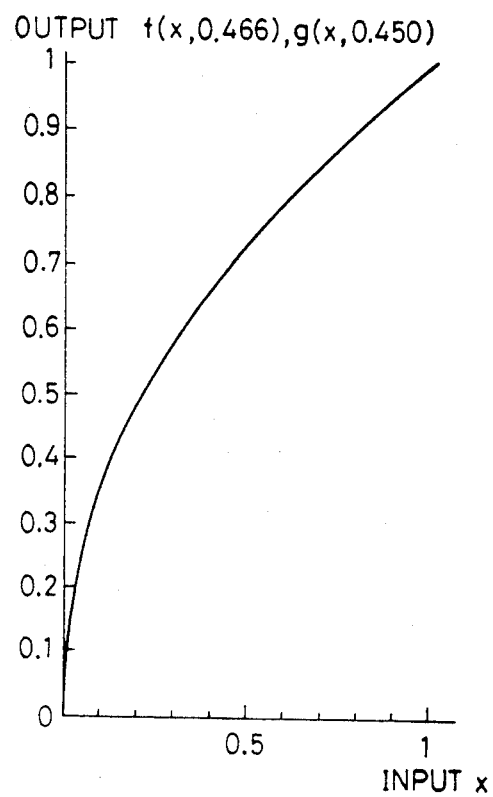
FIG. 3A is a table showing the output signals g (x, γ) and f(x, k) with respect to an input signal x.
FIG. 3B is a graph correspondingly showing the output signals g(x, γ) and f(x, k) with respect to the input signal x.

FIG. 3A shows the errors and the outputs of the equation f(x, k) and the equation g(x, $\gamma$) with respect to the input signal x calculated by the following equation, where $\gamma=0.45$ and k=0.466:

$$|f(x)-g(x)|.$$

FIG. 3B shows the outputs of the equation f(x, k) and the equation g (x, $\gamma$) with respect to the input signal x, where $\gamma=0.45$ and k=0.466.

It can be found that there is hardly a difference between the equations f(x, k) and g(x, $\gamma$). From FIG. 3B, it can be seen that the two equations are substantially indicated by a single curve.

As apparent from the above, according to the present invention, only two kinds of coefficients A and B are enough. The memory capacity of the look-up table is 256×2=512 bytes when the quantizing bit number is equal to 8 bits. Accordingly, it is possible to produce any desired gamma characteristic between the coefficients A and B by setting the coefficients, k, with a simple circuit arrangement.

In the above, the present invention has been explained with respect to the embodiment arranged by discrete circuits, but, the present invention should not be limited only to such an embodiment. According to the present invention, for example, it is of course easy to realize the above-explained calculation in the form of software in which the calculation is processed by a computer with reference to a look-up table.

While in the above embodiment, the gamma correction circuit is embodied in the case of a video processing apparatus, so that the range of the gamma coefficient $\gamma$ is $0\leq\gamma\leq1$, the present invention is not limited to this range. That is, the present invention is applicable to the range of $0\leq\gamma$.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A gamma correction circuit comprising:
   a first non-linear circuit having first gamma characteristics and receiving an input signal;
   a second non-linear circuit having second gamma characteristics which are different from said first gamma characteristics, and receiving said input signal;
   a first coefficient circuit for generating a first coefficient which is variable;
   a second coefficient circuit for generating a second coefficient related to said first coefficient;
   a first multiplier for multiplying an output from said first non-linear circuit by the second coefficient derived from said second coefficient circuit;
   a second multiplier for multiplying an output from said second non-linear circuit by the first coefficient derived from said first coefficient circuit; and
   an adder for adding the outputs from said first multiplier and said second multiplier to obtain a gamma correction output.

2. A gamma correction circuit as claimed in claim 1, wherein said first and second non-linear circuits, respectively, have first and second look-up tables which store pairs of inputs x and outputs $x^A$ and pairs of inputs x and outputs $x^B$ with respect to gamma coefficients A and B ($1\geq A>0.45>B\geq 0$) of said first and second gamma characteristics, respectively.

3. A gamma correction circuit as claimed in claim 1, wherein said first coefficient is equal to k, and said second coefficient is equal to (1−k).

4. A gamma correction circuit as claimed in claim 2, wherein said gamma coefficients A and B are substantially equal to 0.55 and 0.35, respectively.

* * * * *